United States Patent
Higuchi et al.

(10) Patent No.: US 7,550,869 B2
(45) Date of Patent: Jun. 23, 2009

(54) ON-VEHICLE APPARATUS THEFT DETERRENCE SYSTEM

(75) Inventors: Takashi Higuchi, Kariya (JP); Ichirou Yoshida, Takahama (JP)

(73) Assignee: Denso Corporation, Kariya (JP)

( * ) Notice: Subject to any disclaimer, the term of this patent is extended or adjusted under 35 U.S.C. 154(b) by 200 days.

(21) Appl. No.: 11/812,806

(22) Filed: Jun. 21, 2007

(65) Prior Publication Data

US 2007/0296563 A1 Dec. 27, 2007

(30) Foreign Application Priority Data

Jun. 21, 2006 (JP) ............................. 2006-171677

(51) Int. Cl.
*B60R 25/04* (2006.01)

(52) U.S. Cl. ................ 307/10.5; 307/10.2; 340/426.36; 340/426.1

(58) Field of Classification Search .................. 307/9.1, 307/10.1, 10.2, 10.5; 340/825.72, 426.36, 340/426.1; 701/36
See application file for complete search history.

(56) References Cited

U.S. PATENT DOCUMENTS 6,208,239 B1 * 3/2001 Muller et al. .......... 340/426.35
6,232,877 B1 * 5/2001 Ashwin .................... 340/572.1
6,577,226 B1 * 6/2003 Steiner ....................... 340/5.62
6,600,430 B2 7/2003 Minagawa et al.
7,098,769 B2 * 8/2006 Ott ............................. 340/5.61
7,461,781 B2 * 12/2008 Coughlin et al. ............ 235/382

FOREIGN PATENT DOCUMENTS

| JP | A-2003-2959 | 1/2003 |
| JP | A-2004-86718 | 3/2004 |
| JP | A-2004-308253 | 11/2004 |
| JP | A-2005-25709 | 1/2005 |
| JP | A-2005-85186 | 3/2005 |
| JP | A-2005-284771 | 10/2005 |

* cited by examiner

*Primary Examiner*—Albert W Paladini
(74) *Attorney, Agent, or Firm*—Posz Law Group, PLC

(57) ABSTRACT

A navigation apparatus is detachably installed to a vehicle and is lockable to implement activation lock of the navigation apparatus. The navigation apparatus stores all of manufacturer serial numbers of wireless IC tags and an ID code. Each IC tag stores the ID code and is attached to a corresponding one of portable items, such as a driver's license, a cellular phone, a wallet and a commutation pass, which are generally used daily. In the navigation system, the manufacturer serial numbers are registered in such a manner that each of manufacturer serial numbers is linked with an icon of a corresponding one of the portable items. When the ID code of the IC tag, which is attached to the corresponding portable item carried by a vehicle occupant, is determined to be valid, the activation lock of the navigation apparatus is released.

7 Claims, 4 Drawing Sheets

ON-VEHICLE APPARATUS THEFT DETERRENCE SYSTEM

CROSS REFERENCE TO RELATED APPLICATION

This application is based on and incorporates herein by reference Japanese Patent Application No. 2006-171677 filed on Jun. 21, 2006.

BACKGROUND OF THE INVENTION

1. Field of the Invention

The present invention relates to an on-vehicle apparatus theft deterrence system.

2. Description of Related Art

Many car navigation apparatuses and car audio apparatuses are detachably installed to vehicles due to functional reasons or its convenience. Furthermore, many users install these apparatuses to his/her vehicle after purchasing of the vehicle (hereinafter, referred to as latter installation). The latter installation allows the user to select and install his/her favorite apparatus to his/her vehicle. However, these latter installed car navigation apparatuses and car audio apparatuses generally have a higher risk of theft in comparison to factory installed car navigation apparatuses and car audio apparatuses, thereby possibly annoying the users.

In order to limit the theft, the following technique is adapted in some cases. Specifically, in the car navigation system, which is stopped and activated simultaneously with stopping and activating of a drive source (e.g., an engine) of the vehicle, when the user stops the drive source of the vehicle, activation lock of the car navigation apparatus becomes effective to lock the activation of the car navigation apparatus. Then, at the time of restarting the drive source of the vehicle, the car navigation apparatus cannot be activated due to the activation lock. In order to release the activation lock, a Memory Stick (a registered trademark of Sony Corporation), which is a storage media having a preset security code, needs to be inserted into a slot of the navigation apparatus to authenticate the security code of the Memory Stick.

At this time, if the user does not carry the Memory Stick, the activation lock cannot be released to advantageously limit unauthorized use of the navigation apparatus. However, the user is annoyed by the need for carrying the Memory Stick with him/her to release the activation lock of the car navigation apparatus. Furthermore, the user may possibly forget to carry the Memory Stick. In such a case, the activation lock of the car navigation apparatus cannot be released.

SUMMARY OF THE INVENTION

The present invention addresses the above disadvantage. According to one aspect of the present invention, there is provided an on-vehicle apparatus theft deterrence system, which includes an on-vehicle apparatus and a plurality of activation lock releasing apparatuses. The on-vehicle apparatus is adapted to be detachably installed to a vehicle and is lockable to implement activation lock of the on-vehicle apparatus and thereby to limit theft of the on-vehicle apparatus. The activation lock releasing apparatuses are usable to release the activation lock of the on-vehicle apparatus and are adapted to be attached to a plurality of portable items, respectively, of a user. Each activation lock releasing apparatus includes a storage means, a wirelessly communicating means and a control means. The storage means is for storing an ID code that is used to release the activation lock of the on-vehicle apparatus. The wirelessly communicating means is for transmitting the ID code to the on-vehicle apparatus through wireless communication. The control means is for controlling the storage means and the wireless communicating means. The on-vehicle apparatus includes an information obtaining means, a storage means and a checking means. The information obtaining means is for obtaining the ID code from each communicatable one of the plurality of activation lock releasing apparatuses through wireless communication. The storage means is for storing at least one authentication ID code. The checking means is for checking validity of each obtained ID code by comparing the obtained ID code with a corresponding one of the at least one authentication ID code. When the checking means determines that the obtained ID code, which is obtained from at least one of the plurality of activation lock releasing apparatuses, is valid, the activation lock of the on-vehicle apparatus is released.

The inventors of the present invention have previously proposed to implement a key function, which can release the activation lock, in a portable item of the user, which is generally carried daily by the user. Specifically, a wireless integrated circuit (IC) tag, in which an identification code (ID code) is registered, is attached to the portable item. Through wireless communication with the car navigation apparatus or the car audio apparatus, validity of the ID code is checked by the navigation apparatus or audio apparatus. When the ID code is determined to be valid, i.e., is authenticated, the activation lock is released.

However, the following disadvantage may possibly be encountered. That is, the user generally carries not only one portable item but multiple portable items daily. Also, these portable items may vary on day-to-day basis.

For example, at the time of driving the vehicle, a driver's license, an ignition key and a wallet are considered as necessary portable items for the driver, i.e., the user. Therefore, it may be possible to put wireless IC tags to the driver's license, the ignition key and the wallet, respectively. In such a case, unless all of these portable items are carried by the user, the user cannot release the activation lock.

Furthermore, it may be assumed that on weekdays, the user normally uses his/her own vehicle from his/her home to a nearby station and then uses a train while carrying a commutation pass from that station. Since the user always carries the commutation pass to commute to his/her workplace on the weekdays, it may be possible to attach the wireless IC tag to a commutation pass holder, which holds the commutation pass. In such a case, when the user does not carry the commutation pass holder along with the driver's license, the ignition key and the wallet, the user cannot release the activation lock. However, the commutation pass is not needed to go for shopping by his/her own vehicle on a weekend. In other words, as long as the user carries the driver's license, the ignition key and the wallet, the user will not have any difficulty for the shopping on the weekend or holiday. Despite of this fact, the user cannot release the activation lock unless the user carries the commutation pass holder even at the time of driving the vehicle for the shopping on the weekend. Therefore, the user always needs to carry all of the above portable items, thereby creating an inconvenience for the user.

However, as described above, according to the one aspect of the present invention, when the checking means determines that the obtained ID code, which is obtained from at least one of the plurality of activation lock releasing apparatuses, is valid, the activation lock of the on-vehicle apparatus is released. Therefore, the user is not required to carry all of the portable items.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment, in which the present invention is implemented in a car navigation apparatus (hereinafter, also referred to as a navigation apparatus), will be described with reference to the accompanying drawings.

The car navigation apparatus of the present embodiment stores all of manufacturer serial numbers (unique numbers or unique individual information) of a plurality of wireless IC tags, which serve as activation lock releasing apparatuses and can release an activation lock. The car navigation apparatus also stores an ID code (a common ID code), which is used in authentication that is required for the releasing of the activation lock. The corresponding unique manufacturer serial number and the above ID code are prestored in each wireless IC tag stores. Specifically, only the predetermined valid wireless IC tags can release the activation lock of the predetermined car navigation apparatus. These predetermined wireless IC tags and the predetermined car navigation apparatus are manufactured and are sold to a user as a single set or unit.

According to the present embodiment, the manufacturer serial numbers of the wireless IC tags are linked with corresponding portable items, respectively, and are registered in the car navigation apparatus. Thereafter, the wireless IC tags are attached to the corresponding portable items, respectively. At the time of releasing the activation lock, the ID code of the wireless IC tag is checked with the ID code in the car navigation apparatus. When the ID code of any one wireless IC tag matches with the ID code, the activation lock is released. Furthermore, information of the portable item, to which the manufacturer serial number of the registered wireless IC tag is linked, is notified to the user. At the time of checking the ID code, when the ID code, which is stored in the wireless IC tag, matches with the ID code, which is stored in the car navigation system, the authentication succeeds. Upon the success of the authentication, the activation lock is released. The present embodiment will be described further below.

Figure 1:
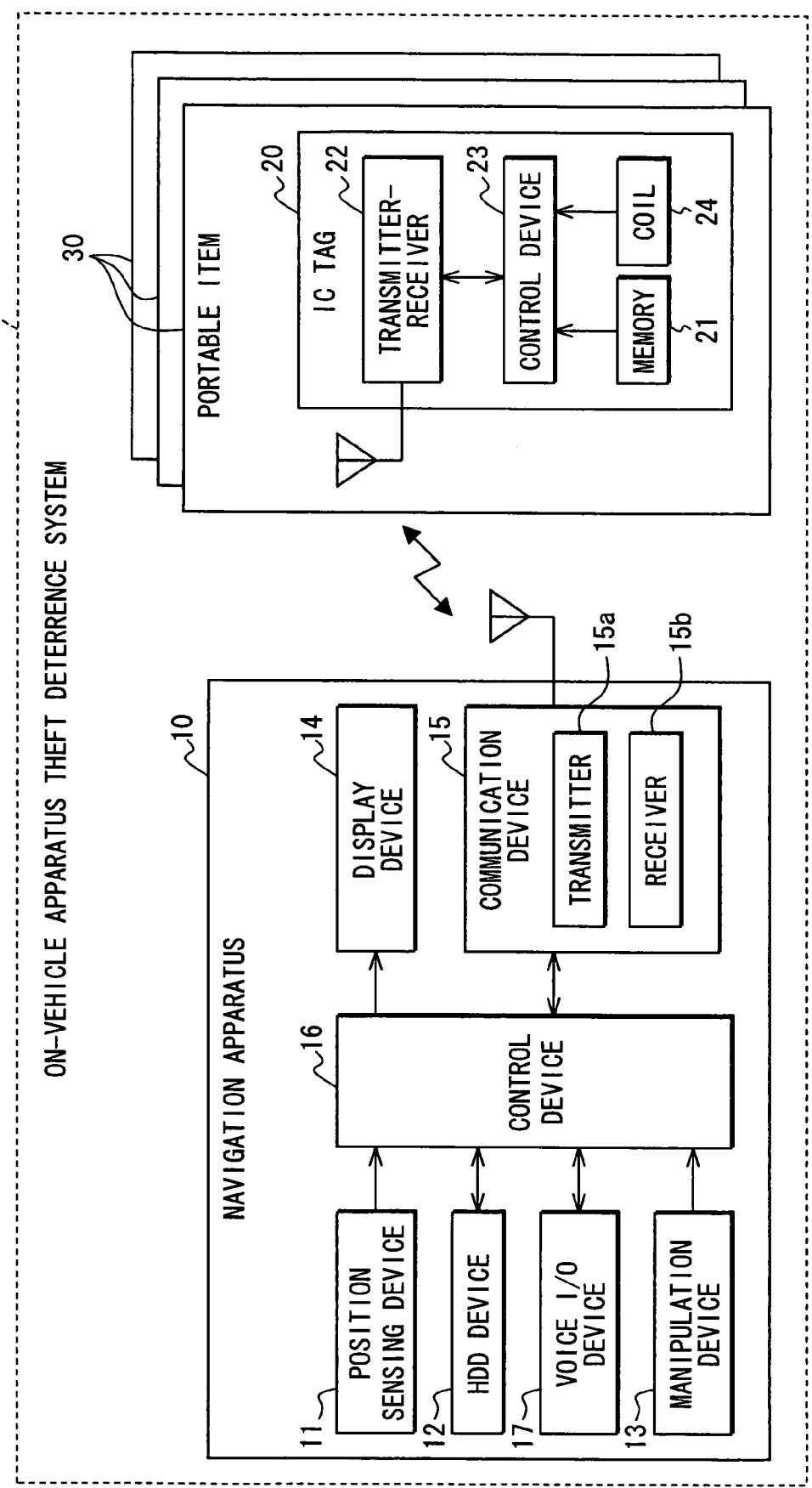
FIG. 1 is a block diagram schematically showing an on-vehicle apparatus theft deterrence system according to a first embodiment of the present invention.

FIG. 1 a block diagram schematically showing an on-vehicle apparatus theft deterrence system of the present embodiment. The on-vehicle apparatus theft deterrence system 100 includes the navigation apparatus 10, the wireless IC tags 20 and the portable items 30 (e.g., a driver's license, a key holder of an ignition key, a wallet, a purse, a commutation pass, a cellular phone). The navigation apparatus 10 has an activation lock function for limiting or deterring the theft. The wireless IC tags 20 are used to release the activation lock through wireless communication with the navigation apparatus 10. The wireless IC tags 20 are attached to the portable items 30. Here, the wireless IC tags 20 may be detachably attached to the portable items 30, respectively. The attachment and detachment of each wireless IC tag 20 to the corresponding portable item 30 may be performed by the user. As discussed above, the wireless IC tags 20 are attached to the portable items 30, respectively. Therefore, the wireless IC tags 20, each of which has the common ID code and the unique manufacturer serial number that is different from the other manufacturer serial numbers, are attached to the portable items 30, respectively.

The navigation apparatus 10 includes a position sensing device 11, a hard disk drive (HDD) device 12, a manipulation device 13, a display device 14, a communication device 15, a control device 16 and a voice input/output device 17, which are interconnected with each other. The position sensing device 11 senses current location information of the vehicle. The HDD device 12 stores data, such as map data, which is retrievable from the HDD device 12. The user uses the manipulation device 13 to input his/her operational command. The display device 14 displays a map and/or other information. The voice input/output device 17 includes a microphone, a speaker and a voice recognition device to receive a voice command from the user and to output a voice notification to the user. The communication device 15 performs wireless communication with the individual wireless IC tag 20.

Specifically, the position sensing device 11 includes a vehicle speed sensor, a gyroscope and a global positioning system (GPS) receiver (not shown) to sense the current location of the vehicle. The vehicle speed sensor senses a vehicle speed to compute a vehicle travel distance. The gyroscope senses a rotational amount (or a turning amount) of the the vehicle. The GPS receiver obtains latitude and longitude information of the vehicle.

The HDD device 12 stores icon data besides the above map data. The icon data (icons) symbolically indicates the portable items 30 of the user. The term "symbolically" means displaying of the corresponding portable item 30 in easily understandable manner or easily imaginable manner for nearly any person. For instance, when the user glances an icon, which is reproduced from the icon data and symbolically indicates the ignition key, the user can instantaneously identify it as the ignition key. The icon data is used at the time of registering and setting the wireless IC tags 20, which will be described latter.

The manipulation device 13 may include a group of mechanical touch switches provided on an instrumental panel or may be a group of touch switches integrated into the display device 14. The user uses the manipulation device 13 to provide the corresponding command to the control device 16 to execute the corresponding operation in the car navigation apparatus 10.

The display device 14 may be a liquid crystal display or an electro luminescence (EL) display. When the touch panel is used for the manipulation device 13, the display device 14 is integrated with the portion of the manipulation device 13 to display the map data to the user and to display or notify the icon data or the other data to the user and also to receive the command from the user.

The communication device 15 includes a radio transmitter 15a and a radio receiver 15b. The radio transmitter 15a has an electromagnetic field generator (not shown) to generate an electromagnetic field, which includes a call signal for calling the wireless IC tag 20 in response to a corresponding command from the control device 16. Then, the radio receiver 15b receives a response signal, which is replied from the corresponding wireless IC tag 20 in response to reception of the call signal. Thereafter, the radio receiver 15b transmits this response signal to the control device 16.

The control device 16 includes a microcomputer, in which a central processing unit (CPU) is connected with memories, such as a read only memory (ROM), a random access memory (RAM). The control device 16 controls the operation of the navigation apparatus 10 and also executes the activation lock of the navigation apparatus 10. Furthermore, the control device 16 releases the activation lock of the navigation apparatus 10 through the ID code authentication. The ROM stores the ID code and the manufacturer serial numbers of the wireless IC tags. The manufacturer serial numbers are linked to the ID code. At the time of releasing the activation lock, the ID code stored in the ROM is used to authenticate the ID code received from the respective wireless IC tags 20, and the manufacturer serial numbers of the wireless IC tags 20 are used to identify the wireless IC tags 20 from which the ID code are received.

The unique manufacturer serial number is printed on a surface of each wireless IC tag 20 to permit visual recognition of the manufacturer serial number. Furthermore, each wireless IC tag 20 includes a nonvolatile memory 21, a transmitter-receiver 22, a tag-side control device 23 and a coil 24. The nonvolatile memory 21 stores the ID code and the manufacturer serial number of its own wireless IC tag 20. The transmitter-receiver 22 performs wireless communication with the navigation apparatus 10. The tag-side control device 23 controls the nonvolatile memory 21 and the transmitter-receiver 22. The coil 24 supplies electric power to the nonvolatile memory 21, the transmitter-receiver 22 and the tag-side control device 23. The above wireless communication and power supply are implemented as follows. First, when the user starts a drive source of the vehicle (i.e., turns on an ignition) or operates a power supply switch to drive the navigation apparatus 10, the control device 16 of the navigation apparatus 10 commands the communication device 15 to generate the electromagnetic field, which includes the call signal. In the former case where the navigation apparatus 10 is driven upon starting the drive source of the vehicle, the navigation apparatus 10 is installed to the vehicle (thereby being connected to a battery of the vehicle), so that the navigation apparatus 10 starts simultaneously with the starting of the drive source. In the latter case where the navigation apparatus 10 is driven upon the operation of the power supply switch, it is presumed that the navigation apparatus 10 is installed to the vehicle or is started independently (standalone).

When the wireless IC tag 20 enters the thus generated electromagnetic field, an induced electromotive force is generated in the coil 24, and thereby the electric power is supplied to each corresponding element. In the wireless IC tag 20, which is now energized, the tag-side control device 23 receives the call signal from the navigation apparatus 10 through the transmitter-receiver 22 right upon receiving the electric power supply. Also, in the wireless IC tag 20, the ID code and the manufacturer serial number, which are stored in the memory 21, are retrieved by the control device 23, and the response single, which includes these retrieved ID code and manufacturer serial number are transmitted to the navigation apparatus 10 through the transmitter-receiver 22.

In the present embodiment, a radio frequency identification (RFID) tag is used as the wireless IC tag 20. The RFID tag is compact and thin and can be easily processed for attachment to the portable items 30.

Figure 3:
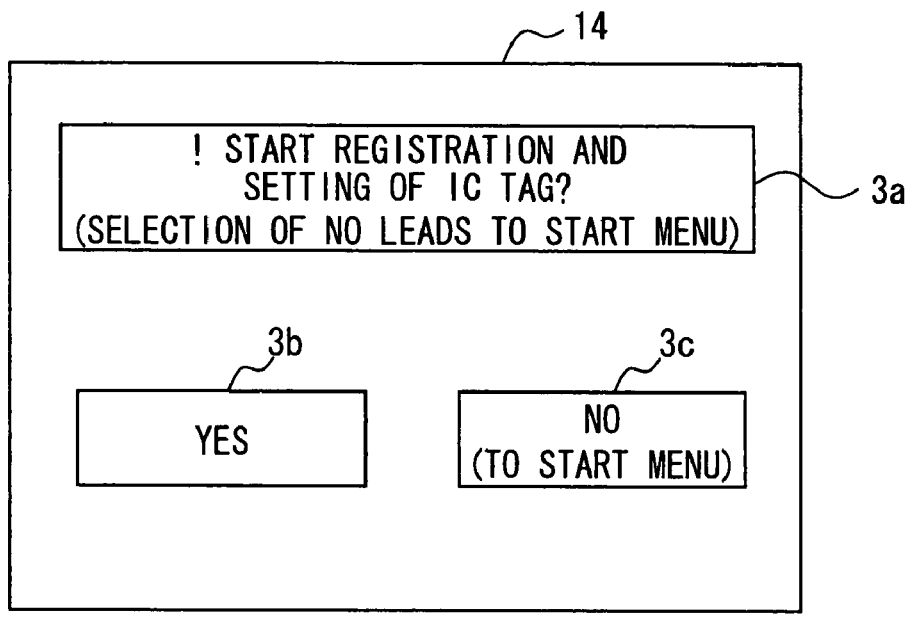
FIG. 3 is a diagram showing a display screen on a display device of the on-vehicle apparatus theft deterrence system.
Figure 4:
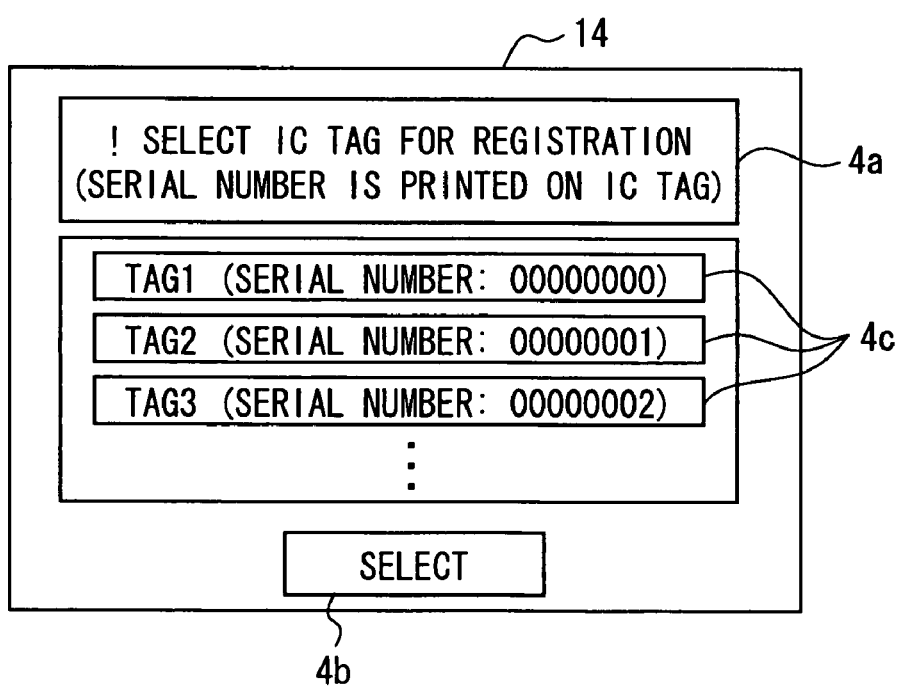
FIG. 4 is a diagram showing another display screen on the display device of the on-vehicle apparatus theft deterrence system.

Next, the registration and setting operation of the wireless IC tag 20, which is executed at the control device 16 of the navigation apparatus 10, will be described with reference to the flowchart of FIG. 2 and the diagrams of FIGS. 3 and 4.

This registration and setting operation is executed at the time of registering each corresponding wireless IC tag 20, which is to be attached to the corresponding portable item 30, in the navigation apparatus 10 in association with the portable item 30 based on the manufacturer serial number of the wireless IC tag 20. Furthermore, this registration and setting operation is required to perform the identifying operation in the navigation apparatus 10 for identifying the linkage between each of the wireless IC tags 20 and a corresponding one of the portable items 30 (described latter in detail with reference to FIG. 5) at the time of the ID code authentication for releasing the activation lock.

Figure 2:
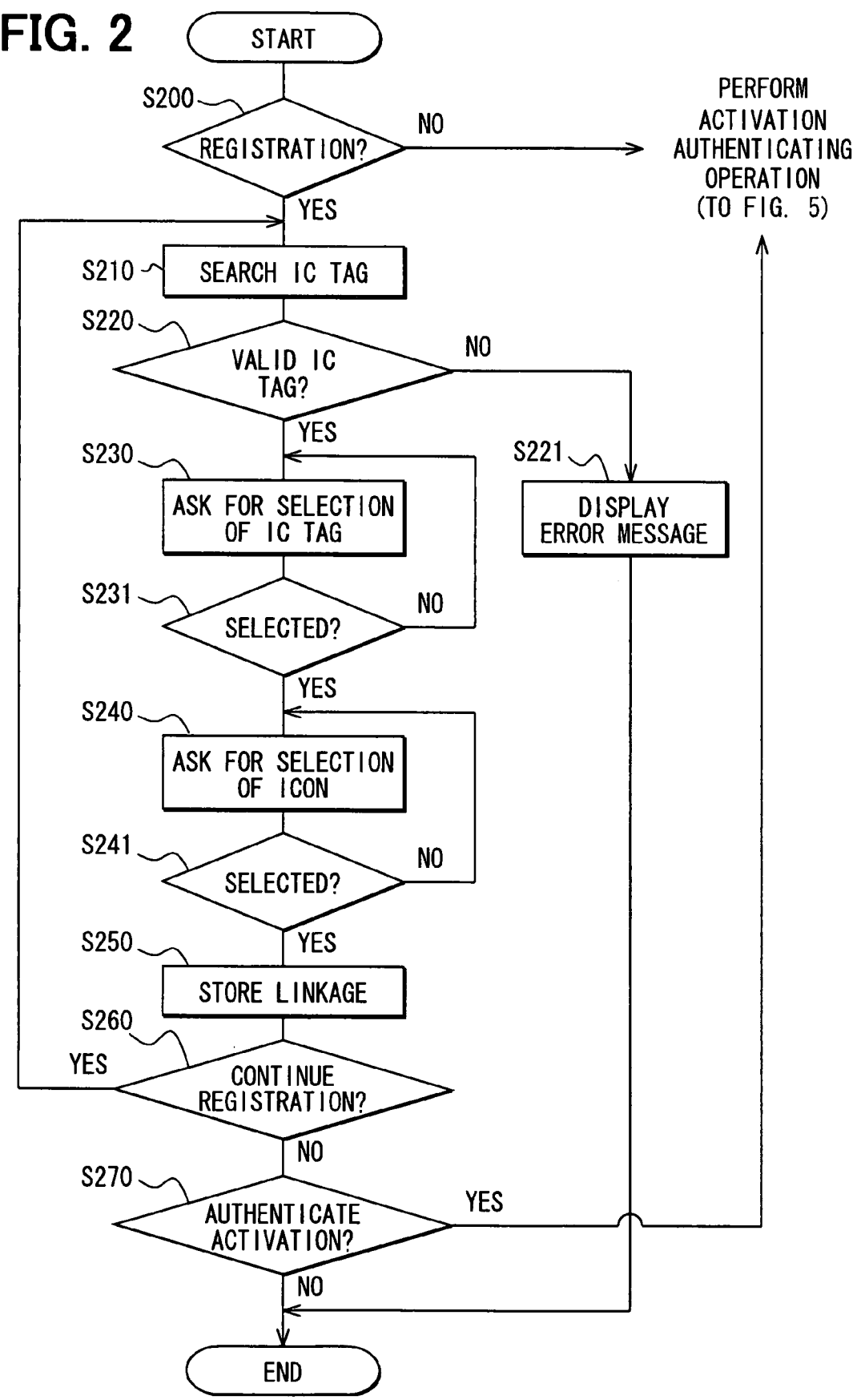
FIG. 2 is a flowchart showing an operation of the on-vehicle apparatus theft deterrence system.

The flowchart of FIG. 2 starts when the user starts the drive source of the vehicle or when the user operates the power supply switch to drive the navigation apparatus 10.

Upon this, the control device 16 starts its operation shown in FIG. 2. First at step S200, it is determined whether the registration and setting operation of the wireless IC tag 20 should be performed. Specifically, as shown in FIG. 3, the control device 16 may command the display device 14 to display a message 3a of, for example, "START REGISTRATION AND SETTING OF IC TAG?" or may command the voice input/output device 17 to vocally notify the the message of, for example, "START REGISTRATION AND SETTING OF IC TAG?". When the user commands to start the registration and setting by, for example, depressing a button 3b of FIG. 3 (YES at step S200), the operation proceeds to step S210. In contrast, when the user commands to abort or terminate the registration and setting by, for example, depressing a button 3c of FIG. 3 (NO at step S200), the operation proceeds to an operation for releasing the activation lock, which will be described in detail with reference to FIG. 5.

Then, at step S210, each valid wireless IC tag 20, which can release the activation lock, is sensed or searched. Here, first, the control device 16 obtains the ID code and the manufacturer serial number of the communicatable wireless IC tag 20 through the wireless communication with the wireless IC tag 20 upon commanding the communication device 15 to initiate the communication with the wireless IC tag 20. Then, the obtained ID code and manufacturer serial number of the wireless IC tag 20 is verified with the corresponding stored ID code and manufacturer serial number, which are stored in the ROM to sense the valid wireless IC tag 20, which can release the activation lock. This sensing operation may be performed at predetermined time intervals (e.g., every few seconds). Then, the operation proceeds to step S220.

At step S220, it is determined whether any valid wireless IC tag 20, which can release the activation lock, is sensed. When at least one valid wireless IC tag 20 is sensed at step S210 (YES at step S220), the operation proceeds to step S230. In contrast, when no valid wireless IC tag 20 is sensed at step S210 (NO at step S220), the operation proceeds to step S221. At step S221, an error message of, for example, "IC TAG IS NOT SENSED" is displayed on the display device 14, and the current operation is terminated.

At step S230, the control device 16 commands the display device 14 to display the manufacturer serial number of all the sensed valid wireless IC tag(s) 20 and thereby to prompt the user to select his/her desired wireless IC tag 20 subject to the setting. FIG. 4 shows one example of this. The display device 14 may display a message of, for example, "SELECT IC TAG FOR REGISTRATION", as indicated by a numeral 4a in FIG. 4. The user may visually identify the manufacturer serial number, which is printed on the surface of the wireless IC tag 20, and may select the desired wireless IC tag 20 based on the visually identified manufacturer serial number and the screen display (see numeral 4c in FIG. 4) through, for example, use of a button 4b shown in FIG. 4.

Then, at step S231, it is determined whether the user has selected any wireless IC tag 20. When it is determined that the user has not selected any wireless IC tag 20 at step S231 (i.e., NO at step S231), the operation returns to step S230. In contrast, when it is determined that the user has selected his/her desired wireless IC tag 20 (i.e., YES at step S231), the operation proceeds to step S240.

At step S240, the selected wireless IC tag 20 is registered in the navigation apparatus 10 in association with the portable item 30, to which the selected wireless IC tag 20 should be attached. Specifically, the manufacturer serial number of the wireless IC tag 20 is linked with the corresponding icon (icon data), which symbolically indicates the corresponding portable item 30 and is stored in the HDD device 12. For this purpose, the control device 16 commands the display device 14 to display a list of selectable icons and prompt through voice or screen display the user to select one of the icons. In this way, the user can select the appropriate icon that is related to the portable item 30, to which the wireless IC tag 20 is attached. For instance, when the user intends to attach the wireless IC tag 20 to his/her wallet, the user can select the corresponding icon, which indicates the wallet.

At step 5241, it is determined whether the icon is selected by the user. When it is determined that the user has not selected any icon at step S241 (i.e., NO at step S241), the operation returns to step S240. In contrast, when it is determined that the user has selected the icon at step S241 (i.e., YES at step S241), the operation proceeds to step S250.

At step S250, the control device 16 links the manufacturer serial number of the selected wireless IC tag 20 with the selected icon data (the selected icon), which is selected by the user for the selected wireless IC tag 20. Then, the control device 16 stores this link information in the ROM and proceeds to step S260. Although the link information is stored in the ROM in this instance, the link information may be alternatively stored in the HDD device 12.

At step S260, it is determined whether the user asks for continuation of the registration and setting operation. Here, it should be noted that the registration and setting of the above selected wireless IC tag 20 is completed at the end of step S250. However, the user may want to continue registration and setting of another unregistered wireless IC tag 20 by selecting it and linking it with the corresponding icon through the above described steps. Therefore, at step S260, presence of such a need for the continuation of the registration and setting operation is checked. When it is determined that the user asks for the continuation of the registration and setting operation at step S260 (i.e., YES at step S260), the operation returns to step S210. In contrast, when it is determined that the user does not ask for the continuation of the registration and setting operation at step S260 (i.e., NO at step S260), the operation proceeds to step S270.

At step S270, it is determined whether the activation of the navigation apparatus 10 through authentication of the activation upon termination of the registration of the wireless IC tag 20 is required by a way of an inquiry to the user. When it is determined that the activation of the navigation apparatus is required at step S270 (i.e., YES at step S270), the operation proceeds to the activation authenticating process of FIG. 5, which will be described latter. In contrast, when it is determined that the activation of the navigation apparatus is not required at step S270 (i.e., NO at step S270), the operation is terminated (by turning off the power).

Upon the registration of each corresponding wireless IC tag 20 in the above described manner, the user may attach the registered wireless IC tag 20 to the corresponding portable item 30. In this way, the user can provide the key function for releasing the activation lock to the portable item 30 and can also register the portable item 30 in the navigation apparatus 10 in association with the corresponding icon.

It is desirable that the user can invalidate the ID code of any particular wireless IC tag 20 by inputting a password and specifying the corresponding manufacturer serial number of that wireless IC tag 20 through operation of the manipulation device 13. This is due to the following reason. That is, when the user loses the wireless IC tag 20 alone or the portable item 30 with the wireless IC tag 20, someone who has picked up it may possibly have a chance to release the activation lock and steal the navigation apparatus 10. In order to obviate such an incident from occurring, it is desirable to implement the invalidating function for invalidating the ID code of any particular wireless IC tag 20.

Next, the activation lock releasing operation of the control device 16 for releasing the activation lock of the navigation apparatus 10 of the present embodiment will be described with reference to FIG. 5.

This operation is required to perform the identifying operation (authenticating operation) in the navigation apparatus 10 for identifying the linkage between each of the wireless IC tags 20 and a corresponding one the portable items 30 at the time of the ID code authentication for releasing the activation lock. Specifically, when the activation lock is released through use of the registered portable item 30, which is registered by the operation described with reference to the flowchart in FIG. 2, it is determined which one or more of the registered portable items 30 is used in the ID code authentication to release the activation lock and which one or more of the registered portable items 30 is not used in the ID code authentication. Based on this determination, a user's carrying state of the portable items 30 (i.e., information that indicates which one or more of the portable items 30 is carried by the user and which one or more of the portable items 30 is not carried by the user) is notified to the user.

In order to more specifically describe this operation, the following situation is assumed. That is, at the time of the registration and setting operation of the wireless IC tags 20 in the navigation apparatus 10 through the operation shown in FIG. 2, the icons (icon data), which indicate a driver's license, a cellular phone, a wallet and a commutation pass (or a commutation pass holder), respectively, are linked with the wireless IC tags 20. Then, these wireless IC tags 20 are attached to the actual driver's license, the actual cellular phone, the actual wallet and the actual commutation pass holder, respectively.

Figure 5:
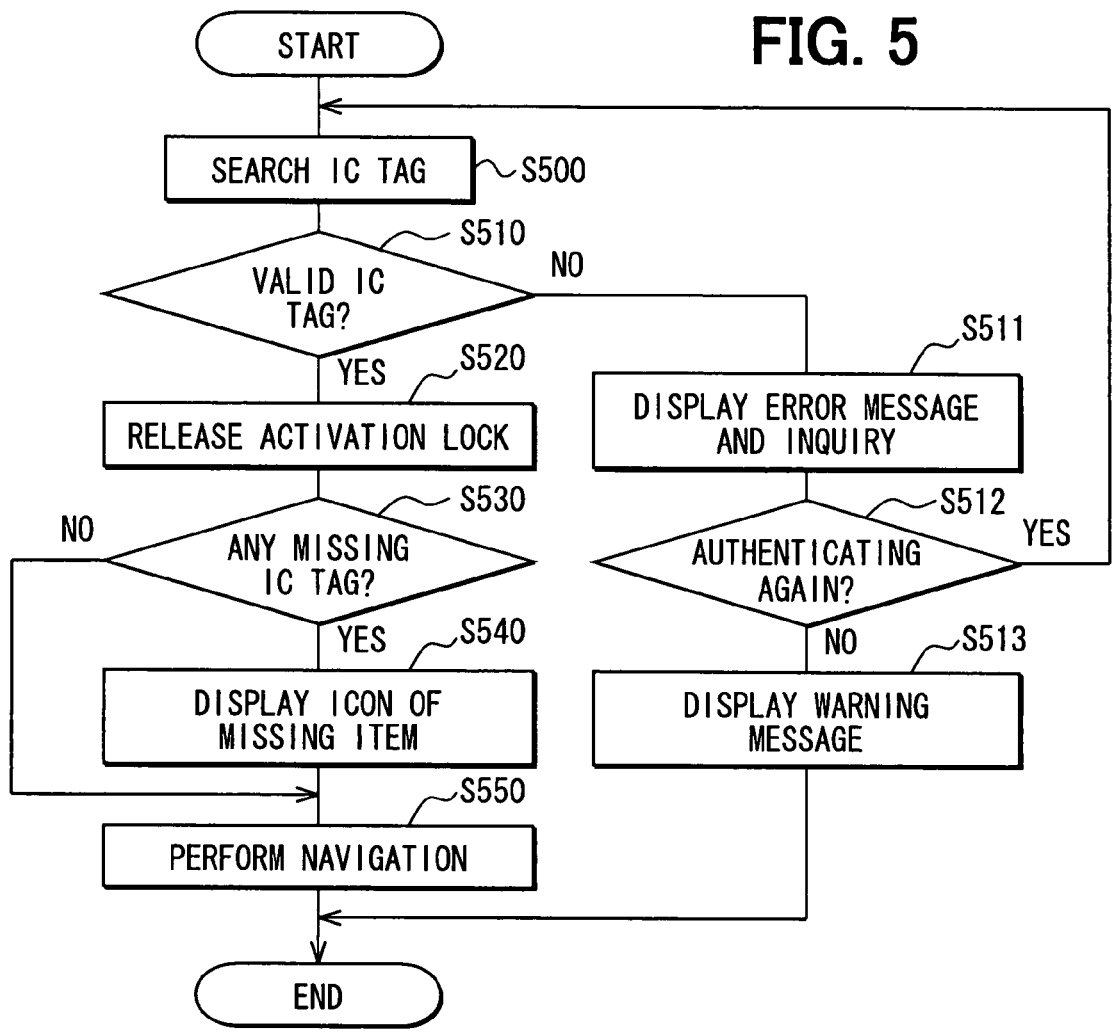
FIG. 5 is a flowchart showing an operation of the on-vehicle apparatus theft deterrence system continued from the flowchart of FIG. 2.

The operation of the flowchart shown in FIG. 5 is started when NO is returned at step S200 of the flowchart shown in FIG. 2 or when YES is returned at step S270. Upon this, the control device 16 proceeds to step S500. At step S500, each valid wireless IC tag 20, which can release the activation lock, is sensed or searched. Since this step S500 is similar to step S210 of FIG. 2, details of step S500 will not be described further.

Then, at step S510, it is determined whether any valid wireless IC tag 20, which can release the activation lock, is sensed. When it is determined that one or more valid wireless IC tag 20 is sensed at step S500 (i.e., YES at step S510), the operation proceeds to step S520 to release the activation lock.

In contrast, when it is determined that none of the valid wireless IC tags 20 is sensed at step S500 (i.e., NO at step S510), the operation proceeds to step S511.

In this way, as long as the user carries any one of the valid portable items 30, to each of which the corresponding registered wireless IC tag 20 is attached, the user can release the activation lock of the navigation apparatus 10. Since the above portable items 30 are generally carried daily by the user, there is only a low possibility of forgetting to carry all of these portable items 30. Therefore, it can be expected to reduce an incidence of unable to release the activation lock due to the forgetting to carry all of the portable items 30. Also, since the user is not required to carry all of the above portable items 30, the user will not be annoyed.

After step S520, the control device 16 proceeds the operation to step S530.

At step S530, it is determined whether there is any registered wireless IC tag(s) 20, the ID code of which is not obtained by the navigation apparatus 10 at the time of authenticating each ID code for releasing the activation lock. In other words, it is determined whether the user does not carry any one or more of the registered wireless IC tags 20, which are registered at the operation described with reference to FIG. 2. Specifically, the control device 16 identifies the manufacturer serial numbers of the registered wireless IC tags 20 by checking the linkages between the icons (icon data) and the manufacturer serial numbers of the wireless IC tags 20, which are stored in the HDD device 12. Then, at the time of authenticating each corresponding ID code for releasing the activation lock, each manufacturer serial number, which is obtained from all of the currently sensed wireless IC tag(s) 20, is checked with the manufacturer serial numbers of the all of the registered wireless IC tags 20.

When the manufacturer serial numbers of the registered wireless IC tags 20 contain any manufacture serial number, which does not match with any of the manufacturer serial numbers of the currently sensed wireless IC tags 20 (i.e., YES at step S530), i.e., when all of the registered wireless IC tags 20 are not carried by the user at the time of authenticating each corresponding ID code, it is determined that the user does not carry one or more of the registered portable items 30 (i.e., there is one or more missing portable items 30 or one or more missing registered wireless IC tags 20). Then, the operation proceeds to step S540.

At step S540, any missing one or more of the registered portable items 30, which are not carried by the user, is notified to the user by displaying the corresponding one or more icons of the portable items 30. More specifically, any one or more of the manufacturer serial numbers of the registered wireless IC tags 20, which are not included in the manufacturer serial numbers of the wireless IC tags 20 that are obtained at the time of authenticating each corresponding ID code, are identified. Then, the icon(s) of the missing portable item(s), which is linked with the missing one(s) of the manufacturer serial numbers of the registered wireless IC tags 20, is displayed on the display device 14.

Figure 6:
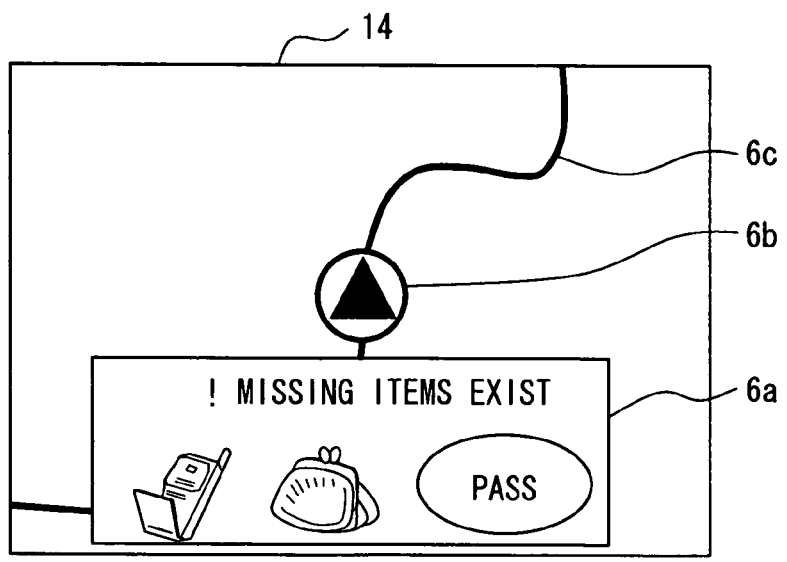
FIG. 6 is a diagram showing an exemplary display screen on the display device of the on-vehicle apparatus theft deterrence system.

Here, one such example is shown in FIG. 6. In this example, the following situation is assumed. That is, the user has previously registered the icons of the driver's license, the cellular phone, the wallet and the commutation pass (the commutation pass holder) in association with the wireless IC tags 20, respectively, in the navigation apparatus 10. Then, the user has attached these registered wireless IC tags 20 to the driver's license, the cellular phone, the wallet and the communication pass (the commutation pass holder), respectively. Now, the user carries only the driver's license without the other portable items and activates the navigation apparatus 10, the icons of the missing cellular phone, the missing wallet and the missing commutation pass (the commutation pass holder) are displayed on the display device, as indicated in an area 6a in FIG. 6.

In this way, the user can know that he/she has the missing portable item(s) and also what it is. This notification may be accompanied with the vocal notification. However, it is desirable that the display (the display area 6a in FIG. 6) and/or the vocal notification should be terminated after elapse of a predetermined time period. This is due to the fact that the missing portable item(s) may not be absolutely necessary to carry with him/her, or the missing portable item(s) may be intentionally left in his/her home or anywhere else. In such a case, the above notification would just bother him/her.

Instead of notifying the missing portable item(s), each carried portable item (i.e., the driver's license in this example), which is carried by the user, may be notified to the user. In this way, the user can clearly recognize, which one(s) of the portable items he/she carries with him/her.

In contrast, when it is determined that the currently sensed manufacturer serial numbers of the wireless IC tags 20 include all of the manufacturer serial numbers of the registered wireless IC tags 20 at step S530 (i.e., NO at step S530), it is determined that the user carries all of the registered portable items 30. Then, the operation proceeds to step S550 where the normal operation of the navigation apparatus 10 is performed. At this time, it is desirable to indicate a message of, for example, "THERE IS NO MISSING PORTABLE ITEM" on the display device 14. When the user stops the drive source of the vehicle or when the user operates the power supply switch to stop the navigation apparatus 10, the operation of the flowchart shown in FIG. 5 is terminated.

In contrast, when the valid wireless IC tag(s) 20, which can release the activation lock, is not sensed at step S510, the operation proceeds to step S511. At step S511, the control device 16 commands the display device 14 to display an error message to notify the failure of the ID code authentication and inquires the user whether the authenticating operation needs to performed once again.

When the user commands to perform the authenticating operation once again at step S512 (i.e., YES at step S512), the operation returns to step S500. In contrast, when the user does not command the authenticating operation once again at step S512 (i.e., NO at step S512), the operation proceeds to step S513.

At step S513, the control device 16 commands the display device 14 to display a warning message for notifying the unreleasable state of the activation lock of the navigation apparatus 10, thereby resulting in the nonoperational state of the navigation apparatus 10. Then, the control device 16 waits for the operation that stops the navigation apparatus 10. Here, it may be desirable to display the warning message on the display device 14 at the time of reactivating the navigation apparatus 10. In this way, when someone steals the navigation apparatus 10 and then tries to sell the stolen navigation apparatus 10 to get cash at a resale shop, an owner of the resale shop may possibly notice that the navigation apparatus 10 is the stolen item because of the displaying of the warning message. Therefore, it is possible to limit occurrence of theft.

Second Embodiment

In the first embodiment, the user is required to carry at least one of the valid wireless IC tags 20, which can release the activation lock of the navigation apparatus 10. However, in some cases, the user may want to specify particular one (or particular set) of the wireless IC tags 20, which can be used to release the activation lock of the navigation apparatus. Thus, unless the specified one (or set) of the wireless IC tags 20 is carried with the user, the user cannot release the activation lock.

Specifically, in the case of the flowchart shown in FIG. 2, the user may be asked to specify any particular one (or set) of the wireless IC tags 20 at the time of performing the activation authenticating operation after the operation at step S250 of FIG. 2, at which the manufacturer serial numbers of the wireless IC tags 20 are linked with the icons, respectively. Then, if the user specifies any particular one (or set) of the wireless IC tags 20, the specified one (set) of the wireless IC tags 20 is stored at step S250. Thereafter, the operation may proceeds to step S260. In contrast, if no such one is specified, the operation may proceed to step S260 without taking any action.

Then, in the flowchart of FIG. 5, after the sensing operation for sensing the valid wireless IC tag(s) 20 at step S500, it may be determined whether the user has previously specified any one (or set) of the wireless IC tags 20 for releasing the activation lock. At this time, when it is determined that the user has previously specified one (or set) of the wireless IC tags 20, then it may be determined that the specified valid one (or set) of the wireless IC tags 20 is sensed at step S510. When YES is returned at step S510, the operation may proceed to step S520. In contrast, when NO is returned at step S510, the operation may proceed to step S511. In a case where the one (or set) of the wireless IC tags 20 has not been previously specified, the normal operation at step S510 should be performed.

In this way, the following advantages can be expected. For instance, it is assumed that on weekdays, the user normally uses the vehicle from his/her home to a nearby station and then uses a train while carrying the commutation pass from that station. In this instance, the user is supposed to carry the driver's license and the ignition key. Before, leaving the home, the user has attached the registered wireless IC tag 20 to his/her commutation pass holder. Specifically, in the navigation apparatus 10, the icon, which indicates the commutation pass (or commutation pass holder), is linked with the manufacturer serial number of the corresponding wireless IC tag 20.

In such a case, the navigation apparatus 10 may have been set through the manipulation device 13 such that the navigation apparatus 10 is operable only under presence of the commutation pass holder. In this way, it is possible to limit theft of the navigation apparatus 10, and also it is possible to limit forgetting to carry the necessary portable item (the commutation pass holder in this instance).

Therefore, in the theft deterrence system for limiting the theft of the on-vehicle apparatus, both of the improved theft deterrence advantage and the improved convenience in use of the on-vehicle apparatus can be achieved.

Now, modifications of the above embodiments will be described.

In the above embodiments, the ROM of the control device 16 of the navigation apparatus 10 stores the manufacturer serial numbers of all of the valid wireless IC tags 20 and the single common ID code. Also, each wireless IC tag 20 stores its unique manufacturer serial number and the ID code. The above embodiments may be modified such that the ID code, which is used to release the activation lock, may differ from one wireless IC tag 20 to another wireless IC tag 20. That is, the ROM may store the ID codes of all of the valid wireless IC tags 20 (ID codes that are unique to the wireless IC tags 20), and each wireless IC tag 20 may store its unique ID code.

This modification may result in a change in the registration and setting operation of the wireless IC tags 20 of FIG. 2 or a change in the activation authenticating operation of FIG. 5. Specifically, at step S210 or at step 5500, the control device 16 may authenticate and identify the ID code obtained from each corresponding wireless IC tag 20 based on the multiple ID codes stored in the ROM. Other than this part, the rest of the operation will be the same as that of the above embodiments.

In this way, it is not required to store the manufacturer serial numbers (individual information), each of which is used to identify the corresponding wireless IC tag 20 at the navigation apparatus 10, in both of the navigation apparatus 10 and the wireless IC tags 20. Furthermore, it is not required to print the corresponding manufacturer serial number on the surface of each wireless IC tag 20 to permit the visual recognition of the manufacturer serial number by the user.

The ID code for releasing the activation lock may be prestored only in the ROM of the navigation apparatus 10 without prestoring it in the respective wireless IC tags 20. In this instance, at the initial setting, the navigation apparatus 10 may send the ID code to the wireless IC tag 20 through the wireless communication and let the wireless IC tag 20 to register it. In this way, any wireless IC tag 20 may be registered as the key for releasing the activation lock. Here, in order to permit use of this in the first or second embodiment, only the corresponding manufacturer serial number may be registered in each wireless IC tag 20, and the ID code may be registered in the wireless IC tag 20 at the initial setting. Alternatively, in order to permit use in the above modification, the navigation apparatus 10 may store the multiple ID codes, and the navigation apparatus 10 may assign the multiple ID codes to the wireless IC tags 20, respectively, to register the ID codes in the wireless IC tags 20, respectively. For the security reason, it is desirable that the navigation apparatus 10 asks for inputting of a password for performing the initial setting. This may limit the thief to set a given wireless IC tag 20 as the key for releasing the activation lock.

The above embodiments and modifications may be further modified in various other ways. For example, in a case where a single vehicle is shared by a family, it could happen that the same type of portable item 30 is owned by multiple members of the family. For instance, the cellular phone of a father differs from the cellular phone of a mother, the cellular phone of his son and the cellular phone of his daughter. In the flowchart shown in FIG. 2, the navigation apparatus 10 can recognize these different cellular phones by the manufacturer serial numbers of the wireless IC tags, which are attached to the cellular phones, respectively. However, in the case where the navigation apparatus 10 has only one icon (icon data) for indicating the cellular phone, when the icon of the cellular phone is displayed as the missing portable item at the time of activating the navigation apparatus 10 at FIG. 5, the user cannot know whether the missing cellular phone is his/her cellular phone or someone else's cellular phone. In view of this, icons may be registered in combination. For example, the icon of the cellular phone may be combined with an icon of facial caricature (e.g., icons indicating faces of the father, of the mother, of the daughter and of the son) and may be registered in association with the manufacturer serial number.

Also, the carrying state of the portable items 30 may be notified on user-by-user basis. This feature is advantageous when multiple users get into the vehicle.

Besides the navigation apparatus, the present invention is also equally applicable to a car audio apparatus.

Additional advantages and modifications will readily occur to those skilled in the art. The invention in its broader terms is therefore not limited to the specific details, representative apparatus, and illustrative examples shown and described.

What is claimed is:

1. An on-vehicle apparatus theft deterrence system comprising:
   an on-vehicle apparatus that is adapted to be detachably installed to a vehicle and is lockable to implement activation lock of the on-vehicle apparatus and thereby to limit theft of the on-vehicle apparatus; and
   a plurality of activation lock releasing apparatuses that are usable to release the activation lock of the on-vehicle apparatus and are adapted to be attached to a plurality of portable items, respectively, of a user, wherein:
   each activation lock releasing apparatus includes:
      a storage means for storing an ID code that is used to release the activation lock of the on-vehicle apparatus;
      a wirelessly communicating means for transmitting the ID code to the on-vehicle apparatus through wireless communication; and
      a control means for controlling the storage means and the wireless communicating means; and
   the on-vehicle apparatus includes:
      an information obtaining means for obtaining the ID code from each communicatable one of the plurality of activation lock releasing apparatuses through wireless communication;
      a storage means for storing at least one authentication ID code; and
      a checking means for checking validity of each obtained ID code by comparing the obtained ID code with a corresponding one of the at least one authentication ID code; and
   when the checking means determines that the obtained ID code, which is obtained from at least one of the plurality of activation lock releasing apparatuses, is valid, the activation lock of the on-vehicle apparatus is released.

2. The on-vehicle apparatus theft deterrence system according to claim 1, wherein:
   the storage means of each activation lock releasing apparatus stores individual information, which is specific to the activation lock releasing apparatus;
   the wirelessly communication means of each activation lock releasing apparatus transmits the individual information to the on-vehicle apparatus together with the ID code;
   the storage means of the on-vehicle apparatus stores the individual information of all of the plurality of activation lock releasing apparatuses in such a manner that the individual information of each activation lock releasing apparatus is linked with a corresponding one of the plurality of portable items;
   the on-vehicle apparatus identifies each valid one of the plurality of activation lock releasing apparatus, from which the valid ID code is obtained, based on the obtained individual information of the valid activation lock releasing apparatus obtained by the information obtaining means and the stored individual information of the valid activation lock releasing apparatus stored in the storage means of the on-vehicle apparatus; and
   the on-vehicle apparatus notifies the user about information of each corresponding valid one of the plurality of portable items, which is linked with the individual information of the corresponding valid activation lock releasing apparatus.

3. The on-vehicle apparatus theft deterrence system according to claim 2, wherein:
   the ID code, which is stored in the storage means of each activation lock releasing apparatus, is specific to the activation lock releasing apparatus;
   the at least one authentication ID code includes a plurality of authentication ID codes, each of which is specific to a corresponding one of the plurality of activation lock releasing apparatuses; and
   the plurality of authentication ID codes are stored in the storage means of the on-vehicle apparatus in such a manner that each of the plurality of authentication ID codes is linked with a corresponding one of the plurality of portable items.

4. The on-vehicle apparatus theft deterrence system according to claim 1, wherein:
   the storage means of each activation lock releasing apparatus stores individual information, which is specific to the activation lock releasing apparatus;
   the wirelessly communication means of each activation lock releasing apparatus transmits the individual information to the on-vehicle apparatus together with the ID code;
   the storage means of the on-vehicle apparatus stores the individual information of all of the plurality of activation lock releasing apparatuses in such a manner that the individual information of each activation lock releasing apparatus is linked with a corresponding one of the plurality of portable items;
   the on-vehicle apparatus identifies each valid one of the plurality of activation lock releasing apparatus, from which the valid ID code is obtained, based on the obtained individual information of the valid activation lock releasing apparatus obtained by the information obtaining means and the stored individual information of the valid activation lock releasing apparatus stored in the storage means of the on-vehicle apparatus; and
   the on-vehicle apparatus notifies the user about information of each remaining one of the plurality of portable items, which is linked with the individual information of a corresponding unchecked one of the plurality of activation lock releasing apparatuses that is not checked by the checking means.

5. The on-vehicle apparatus theft deterrence system according to claim 4, wherein:
   the ID code, which is stored in the storage means of each activation lock releasing apparatus, is specific to the activation lock releasing apparatus;
   the at least one authentication ID code includes a plurality of authentication ID codes, each of which is specific to a corresponding one of the plurality of activation lock releasing apparatuses; and
   the plurality of authentication ID codes are stored in the storage means of the on-vehicle apparatus in such a manner that each of the plurality of authentication ID codes is linked with a corresponding one of the plurality of portable items.

6. The on-vehicle apparatus theft deterrence system according to claim 1, wherein:
   the ID code, which is stored in the storage means of each activation lock releasing apparatus, is specific to the activation lock releasing apparatus;
   the at least one authentication ID code includes a plurality of authentication ID codes, each of which is specific to a corresponding one of the plurality of activation lock releasing apparatuses;

the plurality of authentication ID codes are stored in the storage means of the on-vehicle apparatus in such a manner that each of the plurality of authentication ID codes is linked with a corresponding one of the plurality of portable items;

the on-vehicle apparatus identifies each valid one of the plurality of activation lock releasing apparatus, from which the valid ID code is obtained, based on the obtained ID code of the valid activation lock releasing apparatus obtained by the information obtaining means and the stored authentication ID code of the valid activation lock releasing apparatus stored in the storage means of the on-vehicle apparatus; and the on-vehicle apparatus notifies the user about information of each corresponding valid one of the plurality of portable items, which is linked with the ID code of the corresponding valid activation lock releasing apparatus.

7. The on-vehicle apparatus theft deterrence system according to claim 1, wherein:

the ID code, which is stored in the storage means of each activation lock releasing apparatus, is specific to the activation lock releasing apparatus;

the at least one authentication ID code includes a plurality of authentication ID codes, each of which is specific to a corresponding one of the plurality of activation lock releasing apparatuses;

the plurality of authentication ID codes are stored in the storage means of the on-vehicle apparatus in such a manner that each of the plurality of authentication ID codes is linked with a corresponding one of the plurality of portable items;

the on-vehicle apparatus identifies each valid one of the plurality of activation lock releasing apparatus, from which the valid ID code is obtained, based on the obtained ID code of the valid activation lock releasing apparatus obtained by the information obtaining means and the stored authentication ID code of the valid activation lock releasing apparatus stored in the storage means of the on-vehicle apparatus; and the on-vehicle apparatus notifies the user about information of each remaining one of the plurality of portable items, which is linked with the ID code of a corresponding unchecked one of the plurality of activation lock releasing apparatuses that is not checked by the checking means.

* * * * *